US 009160803B2

(12) United States Patent
Burckart et al.

(10) Patent No.: US 9,160,803 B2
(45) Date of Patent: Oct. 13, 2015

(54) WEB STORAGE OPTIMIZATION

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/529,716

(22) Filed: Jun. 21, 2012

(65) Prior Publication Data

US 2013/0346474 A1   Dec. 26, 2013

(51) Int. Cl.
H04L 29/08   (2006.01)

(52) U.S. Cl.
CPC ............ *H04L 67/2842* (2013.01); *H04L 29/08* (2013.01)

(58) Field of Classification Search
CPC .............. G06F 17/30424; H04L 63/08; H04L 65/1066; H04L 65/1069; H04L 67/42; H04L 67/02; H04L 67/14; H04L 67/142; H04L 29/12811; H04L 63/0869; H04L 63/10; H04L 63/126; G06Q 30/0257; G06Q 30/0258
See application file for complete search history.

(56) References Cited

U.S. PATENT DOCUMENTS

| | | | | |
|---|---|---|---|---|
| 2002/0016828 A1* | 2/2002 | Daugherty et al. | ............ | 709/214 |
| 2004/0083343 A1* | 4/2004 | Mithal et al. | ................... | 711/148 |
| 2005/0027798 A1* | 2/2005 | Chiou et al. | ................... | 709/203 |
| 2009/0043881 A1* | 2/2009 | Alstad | ............................ | 709/224 |
| 2010/0235522 A1* | 9/2010 | Chen et al. | ..................... | 709/228 |
| 2012/0036264 A1* | 2/2012 | Jiang et al. | ..................... | 709/226 |
| 2012/0254352 A1* | 10/2012 | Ito et al. | ........................ | 709/217 |
| 2013/0246498 A1* | 9/2013 | Zucknovich et al. | ......... | 709/201 |

OTHER PUBLICATIONS

Barth, HTTP State Management Mechanism. http://tools.ietf.org, Feb. 18, 2011.

* cited by examiner

*Primary Examiner* — Ebrahim Golabbakhsh
(74) *Attorney, Agent, or Firm* — Steven M. Greenberg, Esq.; CRGO Law

(57) ABSTRACT

Embodiments of the present invention provide a method, system and computer program product for Web storage optimization and cache management. In one embodiment, a method of client side cache management using Web storage can include first registering a client browser session in a content browser as a listener to events for Web storage for a particular domain. Subsequently, notification can be received from the content browser of an event of a different client browser session associated with the Web storage. For instance, the notification can result from the different client browser adding a new cache entry to the Web storage, or from the different client browser periodically at a specified time interval indicating a state of one or more cache entries in the Web storage. Finally, in response to the notification, a cache entry in the Web storage can be invalided such as through cache entry removal or compression.

11 Claims, 2 Drawing Sheets

WEB STORAGE OPTIMIZATION

REFERENCE TO CO-PENDING APPLICATIONS FOR PATENT

The present application is related to the following co-assigned U.S. patent applications, which are expressly incorporated by reference herein:

U.S. application Ser. No. 13/529,639, entitled "COMMON WEB ACCESSIBLE DATA STORE FOR CLIENT SIDE PAGE PROCESSING" filed on Jun. 21, 2012.

BACKGROUND OF THE INVENTION

1. Field of the Invention

The present invention relates to state information storage during client side page processing and more particularly to Web data storage for client side page processing.

2. Description of the Related Art

Page processing refers to the receipt, interpretation and rendering of a markup language defined page in a content browser. The most well-known form of a page processing content browser at present is the venerable Web browser in which Web pages are received, processed and rendered. In a conventional Web browser, a markup language page—typically a page defined according to the hypertext markup language (HTML) markup language specification—can be received, interpreted and rendered in a display of a computer. Integral to the HTML processing capabilities of the Web browser is the cookie feature.

The cookie feature provides for short term data storage of state information for a Web page. Cookies have been used for many reasons including session management, personalization and tracking. However, according to the hypertext transfer protocol (HTTP) specification on statement management, a Web browser in respect to the use of cookies need only support a minimal number of cookies. In particular, according to the HTTP specification, a Web browser is expected only to be able to store three-hundred cookies of four kilobytes each, and only twenty cookies per server or domain.

While the cookie feature of HTML can provide a tempting mechanism for data storage in page processing, for many applications—and in particular in light of advances in the acquisition and transfer of digital information such as digital imagery and audio, a client side mechanism of greater capacity is desirable. The HTML version 5 specification addresses this need in defining "Web Storage". Web Storage picks up where cookies left off. In this regard, Web Storage provides both a simple application programming interface (API) to getter and setter methods for key/value pairs and also a default disk space quota of no less than five megabytes per fully qualified domain name.

Consequently, the Web Storage mechanism allows the page developer to define storage for a page of more than just basic user/session info on the client-side. Rather, the Web Storage mechanism permits the storage of user preference settings, localization data, temporary offline storage for batching server writes and much more. Yet further, data stored according to the Web Storage mechanism can be accessed using the familiar JAVASCRIPT™ scripting language, which permits the developer to leverage client-side scripting to do many things that have traditionally involved server-side programming and relational databases.

Despite the advancement in client side storage offered by the Web Storage mechanism in HTML version 5, the Web Storage mechanism is not without fault. First, as clients become more robust and more application code executes within the content browser, the need to cache client side generated content increases. Due to the limitations in the size of the cache, the ability to cache large amounts of client generated content is not available. Secondly, cache management for cache entries utilized by multiple different clients generally requires centralized cache item invalidation in an application server, yet the use of Web storage is restricted to the client and, in any event, client to server communications can be excessive with constant server polling of clients in respect to cache entries.

BRIEF SUMMARY OF THE INVENTION

Embodiments of the present invention address deficiencies of the art in respect to data storage during page processing and provide a novel and non-obvious method, system and computer program product for Web storage optimization and cache management. In one embodiment of the invention, a method of client side cache management using Web storage can include first registering a client browser session in a content browser as a listener to events for Web storage for a particular domain. Subsequently, notification can be received from the content browser of an event of a different client browser session associated with the Web storage. For instance, the notification can result from the different client browser adding a new cache entry to the Web storage, or from the different client browser periodically at a specified time interval indicating a state of one or more cache entries in the Web storage. Finally, in response to the notification, a cache entry in the Web storage can be invalided such as through cache entry removal or compression.

In another embodiment of the invention, a content browsing data processing system can be configured for client side cache management using Web storage. The system can include a host computer with at least one processor and memory and a content browser executing in the memory of the host computer and providing Web storage. Importantly, an event handler can be registered for a content browser session in the content browser to handle events associated with the Web storage. The handler can include program code that when executed in the memory responds to a notification for the Web storage from a different content browser session in the content browser by invalidating a cache entry in the Web storage.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for client side cache management. In an embodiment of the invention, different browser sessions can register to utilize Web storage for a particular domain. As one of the different browser sessions accesses the Web storage, the others of the browser sessions can receive notification of the attempt by the one of the browser session and each of the others of the browser session can determine whether or not to remove or compress entries from the Web storage and can individually act upon this determination. In this way, cache invalidation can be performed by each different browser session at the client rather than the server thus eliminating any need for excessive client-server communications for cache management while permitting compatibility with Web storage which is limited to client access.

Figure 1:
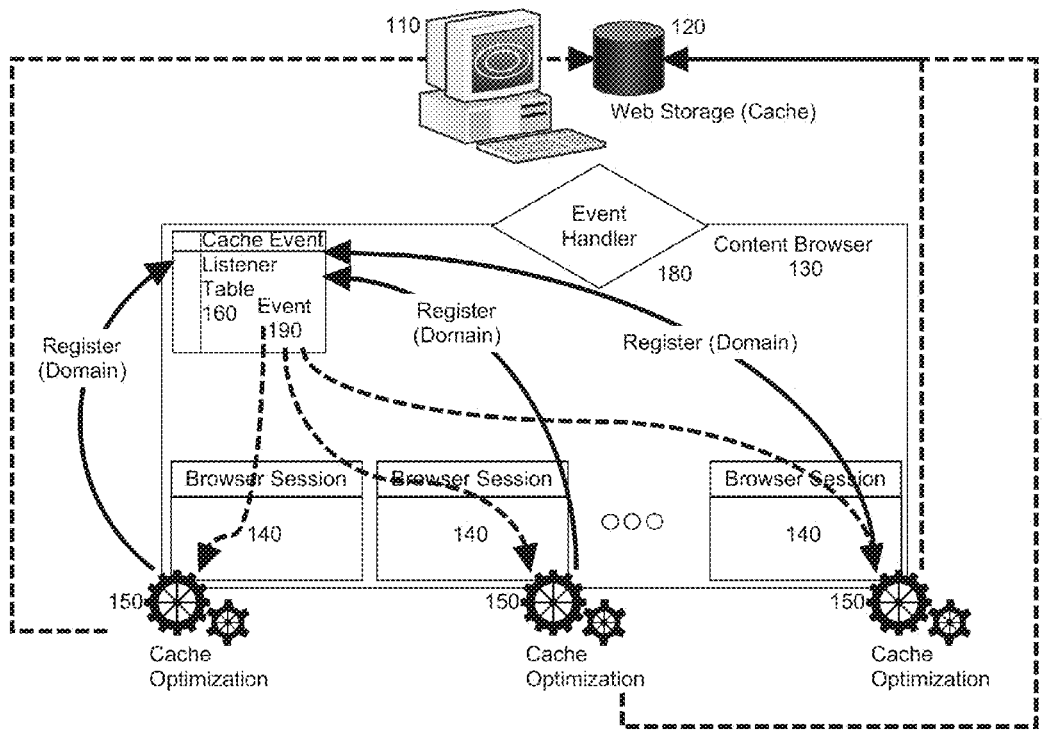
FIG. 1 is a pictorial illustration of a process for client side cache management using Web storage.

In further illustration, FIG. 1 is a pictorial illustration of a process for client side cache management using Web storage. As shown in FIG. 1, a content browser 130 can support different browser sessions 140 in which content retrieved from over a computer communications network can be rendered for viewing by an end user. Each browser session 140 can cache portions of content rendered therein in cache 120 managed by a host computing system 110. The cache 120 can be a remote cache established by way of a localStorage instance sub-classed with logic enabled to store data referenced by a call to the localStorage instance into cache 120, whether the host computing system 110 also hosts the operation of the content browser 130 or whether the host computing system 110 is disposed remotely from a computer hosting the content browser 130 over a computer communications network.

Of note, each browser session 140 can include cache optimization logic 150. The cache optimization logic 150 can register a corresponding browser session 140 with a cache event listener table 160 for a specific domain from which content is retrieved and cached in the cache 120. The cache optimization logic 150 additionally can post an event 190 associated with a particular domain to an event handler 180 for the content browser 130 whenever the corresponding content browser session 140 attempts access to data for the particular domain in the cache 120. Thereafter, the event handler 180 for the content browser 130 can notify the registered ones of the browser sessions 140 in the cache event listener table 160 of the event 190 for the associated domain. The cache optimization logic 150 of the registered ones of the browser sessions 140, in turn, can perform cache invalidation for data of the associated domain stored in the cache 120. In this way, cache invalidation for data in the cache can be invalidated locally rather than centrally.

Figure 2:
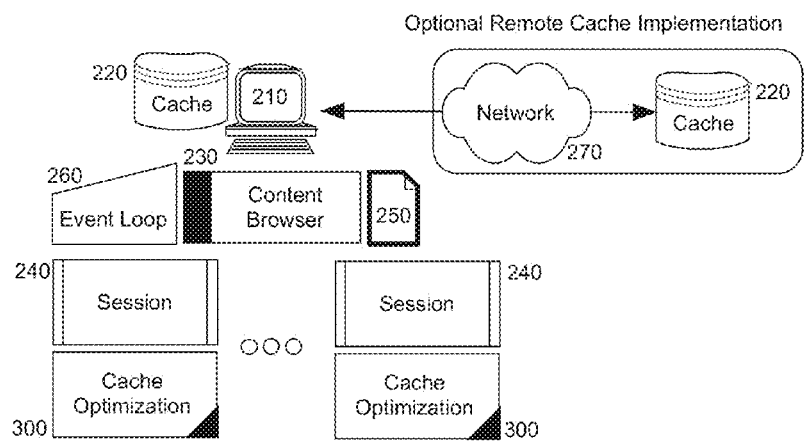
FIG. 2 is a schematic illustration of a page processing data processing system configured for client side cache management using Web storage; and, FIG. 3 is a flow chart illustrating a process for client side cache management using Web storage.

The process described in connection with FIG. 1 can be implemented within a page processing data processing system in which content is retrieved from over a computer communications network and rendered in respective content browsers. In further illustration, FIG. 2 schematically shows a page processing data processing system configured for client side cache management using Web storage. The system can include a host computer 210 with at least one processor and memory supporting the operation of a content browser 230. The content browser 230 can include multiple different content browser sessions 240 each within its own window, each of the content browser sessions 240 displaying content from a common domain and caching portions of the content in a common cache 220 through Web Storage implemented, for example, as a localStorage object instance either locally in connection with the host computer 210, or remotely over computer communications network 270.

Of note, each browser session 240 can include cache optimization logic 300. The cache optimization logic 300 can include program code that when executed in memory of the host computer 210 can register a corresponding one of the content browser sessions 240 in a listener table 250 as a listener for events pertaining to data in the cache 220 for a particular domain. The program code of the cache optimization logic 300 further can be enabled to post events to an event loop 260 for the content browser 230 responsive to attempts to access data in the cache 220 for a particular domain. Finally, the program code of the cache optimization logic 300 can be enabled to respond to events received in the event loop 260 pertaining to an event for which a corresponding one of the content browser sessions 240 has been registered in the listener table 250 by performing cache invalidation upon data in the cache 220 for the particular domain.

Figure 3:
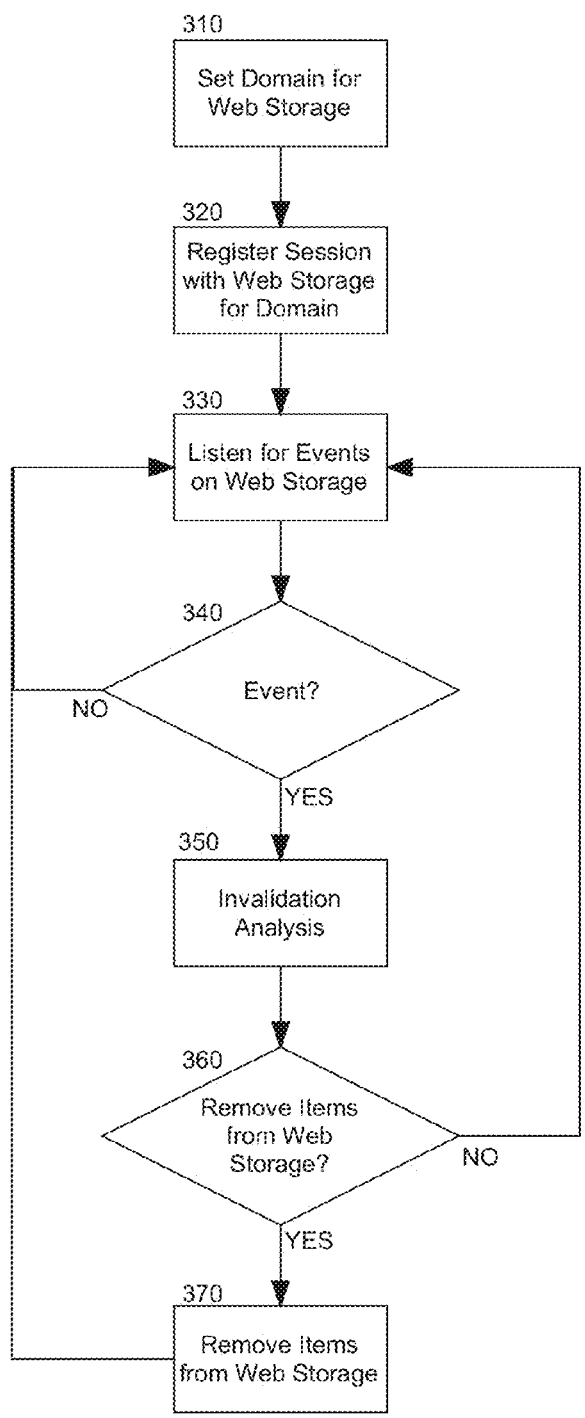

In yet further illustration of the operation of the cache optimization logic, FIG. 3 is a flow chart illustrating a process for client side cache management using Web storage. Beginning in block 310, a particular domain can be determined for caching portions of content in Web storage for a Web page loaded in a content browser session of a content browser. In block 320, the content browser session can be registered in a listener table for caching portions of the content for the particular domain. Thereafter, in block 330, the content browser session can listen for events occurring in an event loop for the content browser pertaining to the caching of portions of data for the particular domain.

In decision block 340, if an event occurs pertaining to the caching of portions of data for the particular domain, in block 350 an invalidation analysis can be performed in respect to portions of data stored in the cache. For example, a least recently used algorithm can be applied to determine whether or not cached data is to be evicted from the cache. In decision block 360, it can be determined whether or not to remove any data stored in the cache. If so, in block 370 items designated by the invalidation analysis can be removed from the cache. Thereafter, the process can repeat through block 330 with the continued listening for events occurring in the event loop for the content browser pertaining to the caching of portions of data for the particular domain.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/ or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A content browsing data processing system configured for client side cache management using Web storage, the system comprising:
 a host computer with at least one processor and memory;
 a content browser for registering a client browser session in
  with a cache event listener table as a listener to events for Web storage for a particular domain, the Web storage providing an application programming interface to getter and setter methods for key/value pairs;

at an event handler, for receiving a notification from the content browser of an event of a different client browser session, whenever the second content browser session attempts to access data for a particular session associated with the Web storage; and responsive to the notification, invalidating a cache entry in the Web storage by the registered client browser session.

2. The system of claim 1, wherein the notification results from the different client browser adding a new cache entry to the Web storage.

3. The system of claim 1, wherein the notification results from the different client browser periodically at a specified time interval indicating a state of one or more cache entries in the Web storage.

4. The system of claim 1, wherein the invalidating is a removal of the cache entry from the Web storage.

5. The system of claim 1, wherein the invalidating is a compression of the cache entry in the Web storage.

6. A computer program product for client side cache management using Web storage, the computer program product comprising:

a computer readable storage medium comprising a storage device having computer readable program code embodied therewith, the computer readable program code comprising:

computer readable program code for registering a client browser session in a content browser with a cache event listener table as a listener to events for Web storage for a particular domain, the Web storage providing an application programming interface to getter and setter methods for key/value pairs;

computer readable program code for receiving, at an event handler, notification from the content browser of an event of a different client browser session whenever the second content browser session attempts to access data for the particular session associated with the Web storage; and, computer readable program code for responding to the notification by invalidating a cache entry in the Web storage by the registered client browser session.

7. The computer program product of claim 6, wherein the notification results from the different client browser adding a new cache entry to the Web storage.

8. The computer program product of claim 6, wherein the notification results from the different client browser periodically at a specified time interval indicating a state of one or more cache entries in the Web storage.

9. The computer program product of claim 6, wherein the invalidation is a removal of the cache entry from the Web storage.

10. The computer program product of claim 6, wherein the invalidation is a compression of the cache entry in the Web storage.

11. The computer program product of claim 6, wherein the registered client browser session is uniquely programmed amongst other client browser sessions of the content browser to perform the invalidation in response to the notification.

* * * * *